June 29, 1926.

C. F. DOBLE

DISHWASHER

Filed Dec. 14, 1922

Inventor.
Charles F. Doble
by Heard Smith & Tennant.
Attys.

June 29, 1926.

C. F. DOBLE

DISHWASHER

Filed Dec. 14, 1922

Inventor.
Charles F. Doble
by Heard Smith & Tennant.
Attys.

Patented June 29, 1926.

1,590,230

UNITED STATES PATENT OFFICE.

CHARLES F. DOBLE, OF FLUSHING, NEW YORK.

DISHWASHER.

Application filed December 14, 1922. Serial No. 606,937.

This invention relates to dish-washing machines and particularly to that type of washer embodying rapidly-rotating blades situated beneath the dishes and adapted to project the cleansing fluid upwardly against the dishes with considerable force.

One of the objects of the invention is to provide an improved dish washer of this type which is so constructed that a minimum amount of water will be required in cleansing the dishes.

Another object of the invention is to provide an improved dish washer of this type which is so constructed that the water which drips from the dishes will be conveyed directly to the rotating blades which operate to project it against the dishes again immediately thus obviating the necessity of having a considerable body of water in the receptacle for the blades to operate in.

Still another object of the invention is to provide an improved dish washer of this type which is provided with a drip pan beneath the dishes adapted to catch the drip therefrom and which is constructed so that the water which is collected on the drip pan will be delivered directly to the rotating blades.

Other objects of the invention are to improve dish washers of this type all as will be more fully hereinafter set forth.

In order to give an understanding of the invention I have illustrated in the drawings a selected embodiment thereof which will now be described after which the novel features will be pointed out in the appended claims.

Figure 1:
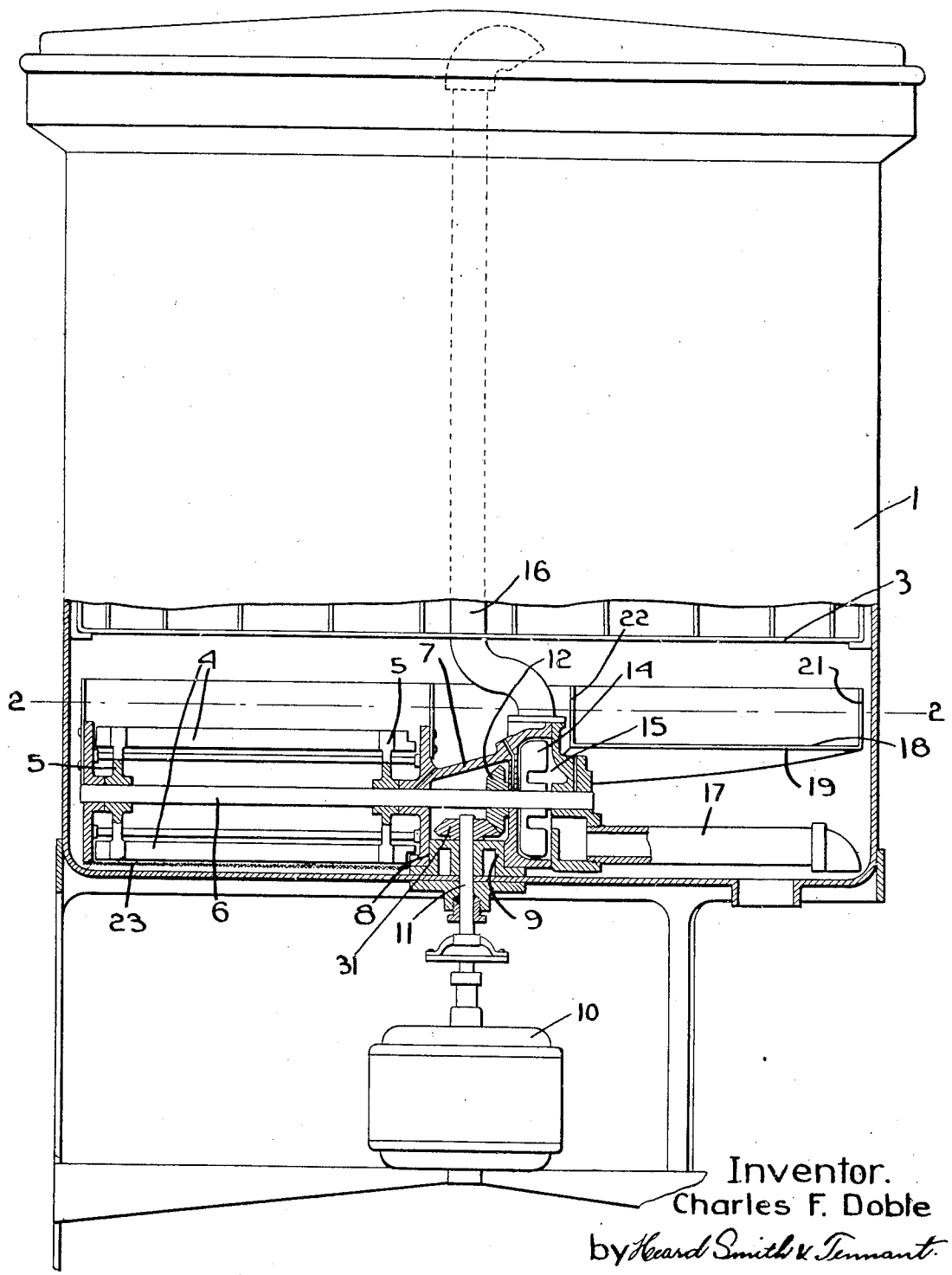
Fig. 1 is a part sectional view of a dish washer embodying my invention.
Figure 2:
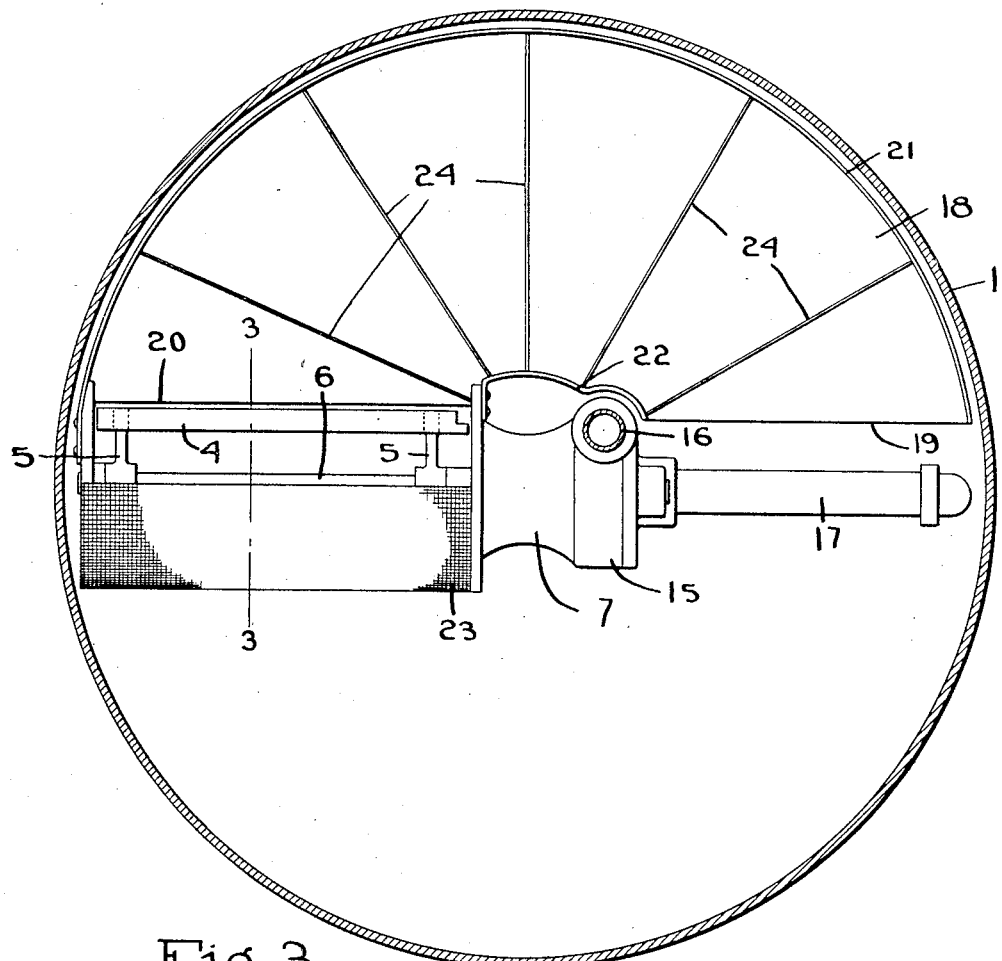
Fig. 2 is a section on the line 2—2, Fig. 1.
Figure 3:
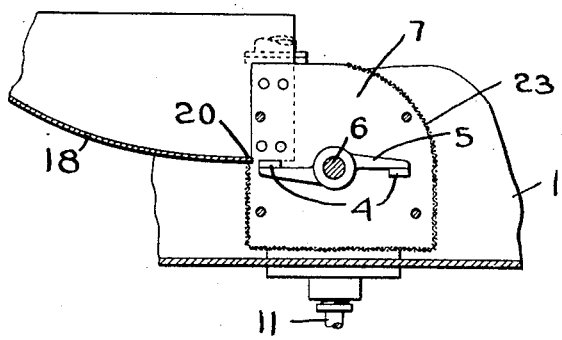
Fig. 3 is a section on the line 3—3 Fig. 2.
Figure 4:
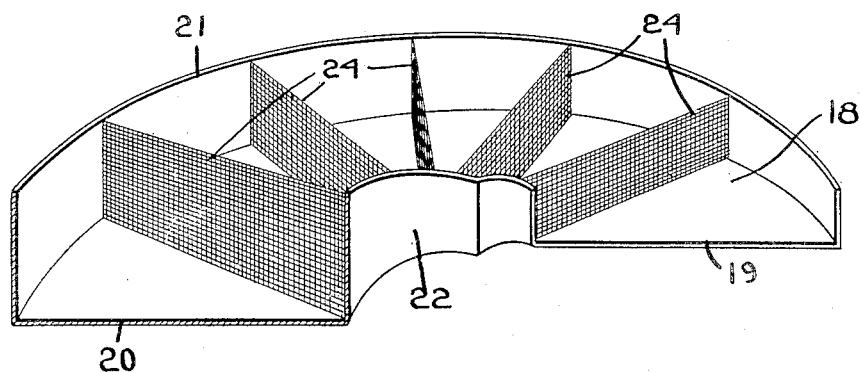
Fig. 4 is a perspective view of the drip pan removed.

The dish washer herein illustrated comprises a receptacle 1 of any suitable style which contains the water or other cleansing fluid and which also contains the dishes to be washed, the latter being supported on a suitable tray or other dish-supporting means indicated at 3. Situated beneath the dish-supporting means are rotary blades 4 operating to project water upwardly against the dishes. In the construction herein shown these blades are secured to arms 5 that are carried by a rapidily-rotating shaft 6, and the construction is such that the blades 4 not only rotate about the axis of the shaft 6 but they have a bodily rotation about a vertical axis so that the upward spray of water reaches all the dishes. To provide for this bodily turning movement about a vertical axis the shaft 6 is carried in a suitable supporting member 7 which is provided with an opening 8 that receives and encircles a boss 9 secured to the bottom of the receptacle 1, said boss constituting a center bearing about which the support 7 may rotate.

The shaft 6 is driven from a motor 10 having a vertical shaft 11 that extends up through the bottom of the receptacle 1 and through the center bearing 9, said shaft having a bevelled gear 31 thereon which meshes with and drives a bevelled gear 12 fast on the shaft 6. Since the support 7 for the shaft rests loosely on the bearing 9 it will follow that the resistance which the blades meet in throwing the water upwardly against the dishes will have a tendency to cause the support 7 to rotate about the bearing 9 and, therefore, the rotation of the motor shaft 11 is partly expended in rotating the shaft 6 and partly expended in causing a relatively slow rotation of the housing 7 and the blades about a vertical axis.

The shaft 6 is shown as having an impeller 14 thereon which operates in a chamber 15 in the housing, said impeller operating as a pump to pump water upwardly through a discharge pipe 16 from the upper end of which it is discharged downwardly onto the dishes. The water for the pump is taken from the bottom of the casing 1 through an inlet pipe 17.

The parts thus far described are or may be all as usual in devices of this character and form no part of the present invention which relates to the manner of supplying water to the rotating blades 4.

Situated beneath the dish-supporting means 3 is a device in the nature of a drip pan adapted to receive the drip from the dishes and deliver it to the blades. This drip pan device is arranged at an inclination and is formed with a delivery edge at its lower end so that the water which collects on the drip pan will flow down to the lower edge and over the latter with a waterfall effect. The rotary blades are situated so that the upward movement of them is beneath the waterfall and as a result the blades are receiving the water which is delivered over said discharge edge and is throwing the water backwardly against the dishes. Because of this manner of supplying the water to the blades it is not necessary to have as great a volume of water in the receptacle as is necessary where the blades have to take the water from the receptacle.

The drip pan device is herein illustrated at 18 and it is in the nature of a plate which is secured to the support 7 and thus rotates about the vertical axis with the support. It is formed on an inclination so that water which is received on the upper end 19 thereof will flow down the inclination and be discharged over the discharge edge 20 which is at the lower end. This discharge edge 20 is a free edge so that the water which flows over it is free and unconfined after it leaves the edge thus producing a true waterfall effect. The edge is also parallel to the shaft 6 and is so situated that the water flowing over said edge will strike the rotatable blades 4 during their upward movement. The blades 4 thus engage or strike the water while it is falling freely from the edge downwardly and while it is unconfined by any walls. The action of the upwardly-moving blades striking the falling water which is free and unconfined results in breaking the sheet of falling water into a spray which is thrown vigorously over the dishes and which produces superior washing effects. This drip pan 18 may if desired, be provided with flanges 21, 22 at its edges so as to prevent the water from flowing off from the edges and compel all the water which collects on the pan to flow down over the discharge edge 20.

In the operation of the device the rotation of the blades 4 and the operation of the pump 14, if a pump is used, causes water to be thrown upwardly against the dishes and also downwardly thereagainst. The water dripping from the dishes which is received on the drip pan 18 will flow down the inclined surface of said pan and will be discharged over the edge 20 with a waterfall effect as shown in Fig. 5.

Figure 5:
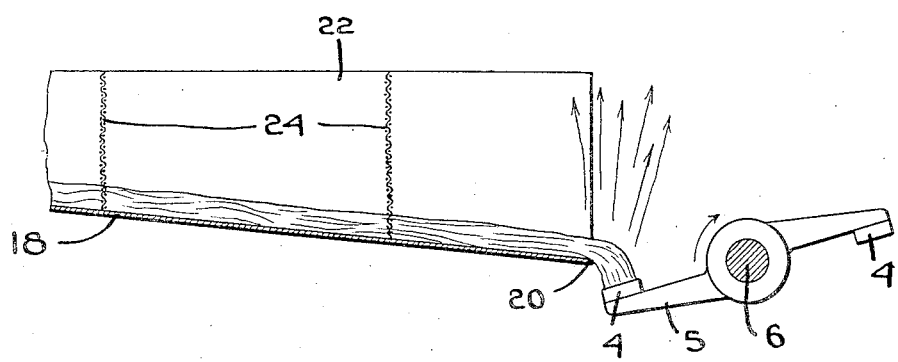
Fig. 5 is a view showing the manner in which the device operates.

The blades 4 are rotating in the direction of the arrow Fig. 5 and, therefore, as each blade moves upwardly from its lowest point to its highest point it meets the waterfall and throws the water back against the dishes violently and with great force as indicated in Fig. 5. By reason of the fact that the water is conducted directly to the blades during their upward movement it will not be necessary to employ any deflector or other similar device to direct the water as it is acted on by the blades. Furthermore this arrangement provides for a thorough cleansing of the dishes with the use of a less quantity of water than is necessary where the blades are operating in a body of water.

If desired I may enclose the blades in a screen 23 which will be carried by the support 7 and I may also provide the drip pan with screens 24 which operate to strain out any solid matter from the water. The purpose of these screens is to keep the water which is thrown back onto the dishes by the blades as free as possible from solid matter.

The drip pan 18 may extend under a greater or less portion of the dishes as desired. In the construction shown it is approximately semi-circular but the dimension thereof may be varied without departing from the invention, the principal feature of which lies in the provision of means for catching the drip from the dishes and conveying it directly to the blades.

I claim:

1. In a dish-washing machine, the combination with a receptacle, of dish-supporting means therein, a drip pan device extending substantially horizontally beneath a portion of the dish-supporting means and above the bottom of the receptacle to catch the drip from the dishes, said drip pan having a delivery edge spaced from the bottom of the receptacle and over which the water collected by said device is discharged so that said water will fall from the delivery edge to the bottom of the receptacle in a free and unconfined condition, and water-throwing blades rotating about a horizontal axis adjacent said delivery edge so that during their upward movement they strike the free unconfined falling water after it leaves said delivery edge thereby breaking the water into a spray which is thrown upwardly onto the dishes.

2. In a dish-washing machine, the combination with a receptacle, of dish-supporting means therein, rotary blades beneath the dish-supporting means adapted to throw water upwardly against the dishes, and a drip pan device extending horizontally beneath a porton of the dish-supporting means to catch the drip from the dishes, said device having a free delivery edge spaced from the bottom of the receptacle and over which the water is discharged with a waterfall effect and which lies in close proximity to the path of rotation of said blades to deliver the water thereto.

3. In a dish-washing machine, the combination with a receptacle, of dish-supporting means therein, a support rotatable about a vertical axis, a drip pan device carried by said support and rotating therewith and extending substantially horizontally beneath a portion of said dish-supporting means to collect the drip from the dishes, said drip pan being situated above the bottom of the receptacle and having a discharge edge also situated above and spaced from the bottom of the receptacle, whereby the water collected by the drip pan will flow over said edge and fall toward the bottom of the receptacle in a free unconfined condition and with a waterfall effect, and rotary blades carried by said support and rotatable about a horizontal axis, said blades extending adjacent said delivery edge so that during their upward movement they strike the free unconfined falling water after it leaves said edge and break it up into a spray which is thrown upwardly against the dishes.

In testimony whereof, I have signed my name to this specification.

CHARLES F. DOBLE.